UNITED STATES PATENT OFFICE.

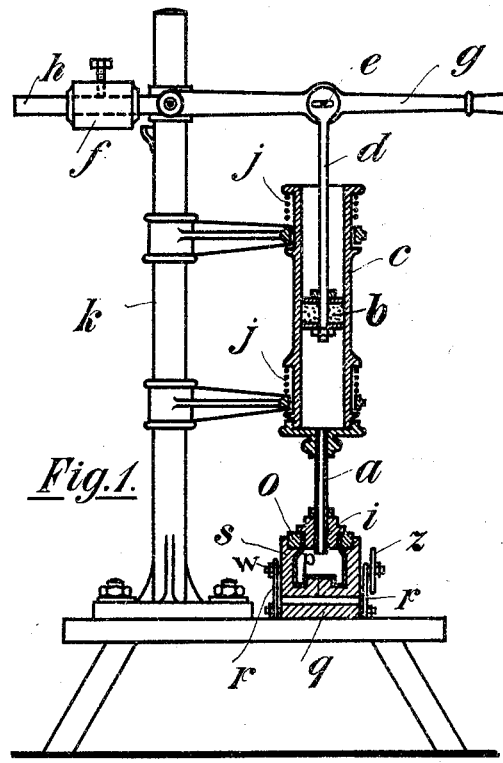
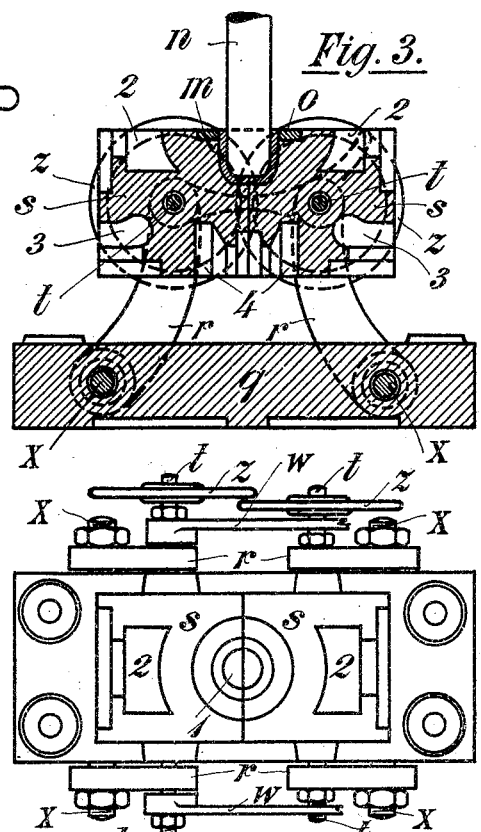
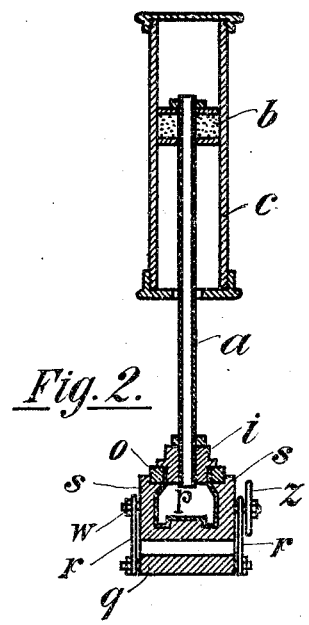
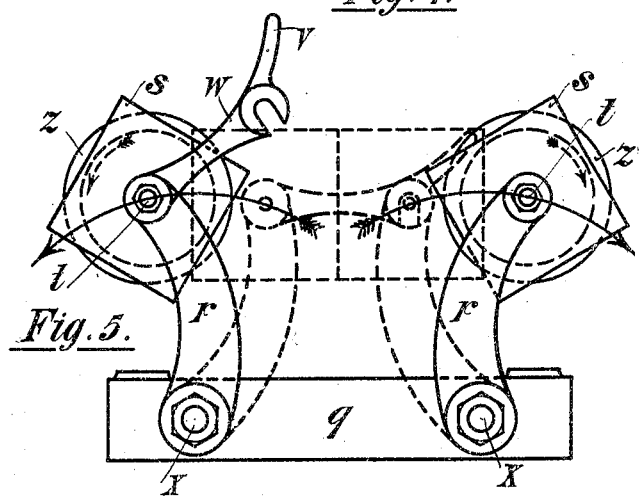
No. 779,159. PATENTED JAN. 3, 1905.
J. HECKER.
APPARATUS FOR FINISHING PRESSED GLASS BODIES.
APPLICATION FILED APR. 26, 1904.
Witnesses:
Inventor:
Josef Hecker No. 779,159.                                                    Patented January 3, 1905.

JOSEF HECKER, OF WEVELINGHOVEN, GERMANY.

APPARATUS FOR FINISHING PRESSED-GLASS BODIES.

SPECIFICATION forming part of Letters Patent No. 779,159, dated January 3, 1905.

Application filed April 26, 1904. Serial No. 205,036.

*To all whom it may concern:*

Be it known that I, JOSEF HECKER, a subject of the German Emperor, and a resident of Wevelinghoven, Kingdom of Prussia, German Empire, have invented certain new and useful Improvements in Apparatus for Finishing Pressed-Glass Bodies, of which the following is a specification.

The process is known of manufacturing articles of hollow glass after giving the glowing liquid mass of glass a preparatory pressing in a mold by the descent of a stamper and by blowing up thereupon this intermediate piece in a second mold of the shape of the article to be produced by means of air which has been previously heated. This heating of the compressed air is necessary in order that the intermediate glass piece does not become too cold in the mold and the work of blowing rendered more difficult. If cold air were used, the surface of the glass article would become rough, cracked, not smooth enough, and any projections, like threads, would not become sharp enough.

The devices and machinery required for carrying out the above-described process are generally very complicated and expensive, the heated compressed air required is produced by special compressors, warmed by heating devices, and conducted through pipes to the blowing-machines, all requirements which greatly increase the cost of such a plant.

The object of the present invention is to produce an apparatus for manufacturing pressed articles of glass in which these drawbacks have been removed in two ways. In the first place this apparatus is a proportionately very simple implement, which produces automatically the quantity of heat required for blowing up the previously-heated air without the use of a special compressor or a separate source of heat, and this blowing apparatus is further so connected and works together with the mold receiving the pressed intermediate form of the article that by means of these two auxiliaries the articles can be produced quite as rapidly by this simple hand apparatus as with the above-mentioned expensive and complicated glass-blowing plants for the manufacture on a large scale and quite as favorably from an economical and technical point of view.

The invention is illustrated in Figures 1 to 5 of the accompanying drawings, wherein—

Fig. 1 shows a longitudinal section through the whole apparatus, consisting of the blowing apparatus and the mold, the blowing apparatus being supposedly arranged on a holding device; and Fig. 2, a longitudinal section through the same apparatus, in which the blowing apparatus is supposed to be held by a hand. Fig. 3 is a side view, and Fig. 4 a ground plan, of the apparatus; Fig. 5, a side view of the mold.

Similar letters refer to similar parts throughout the several views.

The blowing apparatus consists of an ordinary glass-blowing pipe $a$, the air-pump cylinder $c$, and the piston $b$. The latter is in the form of construction shown in Fig. 1 fastened to a bar $d$ (at $e$) of an oscillating double-armed lever $h\,g$, standing under the action of a weight $f$ or of a spring. If the arm $g$ of the double-armed lever, which is provided with a handle, is pressed down, the air before the piston is forced into the glass-blowing pipe $a$, which at the upper end is connected to the bottom of the air-pump cylinder $c$ and at the lower end to a projection or blowing-head $i$ and passes through the pipe into the mold. On releasing the arm $g$ the double-armed lever, which, the same as the air-pump cylinder, is arranged on the stand $k$ in a manner allowing of being raised and lowered within certain limits, which, for instance, may be effected by springs $j$, surrounding the cylinder, rebounds into its former top position under the action of the weight $f$. Instead of moving the piston the cylinder may be moved with the same result as shown in Fig. 2; but then the pipe must be fastened at the top with the piston and open into the space above the same, which is now closed by the cover of the cylinder. On pressing down the cylinder $c$ the air passes then again from the compressing-chamber into the pipe of the mold and serves here to blow up the article of glass. The piece attached to the blowpipe or the blowing-head $i$ must be of the same circumference as the width of the neck-opening of the article to be manufactured and is therefore exchangeable, to be able to use the apparatus for manufacturing different articles of different widths of neck. This may be attained by screwing it, for instance, upon the blowpipe and securing it in its position by a tightening of nuts. Of course the blowing-head is provided on the outside with an incombustible covering—for instance, of asbestos. If now the intermediate shape $m$ (see Fig. 3) has been given to the glass article to be produced by pressing down in the usual manner the stamper $n$, it is conveyed, sitting in the neck-ring $o$, from the pressing-mold to the blowing-mold $s$, as shown in Figs. 1 and 2. The blowing-head $i$ of the pipe $a$ is then introduced into the neck of the hollow glass article $p$, with which it must correspond in width. Air is thereupon forced from the compressing-chamber of the cylinder into the vessel, which thus is blown up inside of the hollow mold till the glass article $p$ is ready.

The heating of the air in the cylinder $c$ is effected in the following manner: The insertion of the head $i$, whose covering is slightly yielding, into the opening of the neck of the intermediate or pressed body $m$ occupies, though only a short, yet a measurable length of time. During the insertion or the pressing of the closely-fitting blowing-head into the opening of the vessel the hot air inside of this glowing body is compressed a little and as a result partly passes into the compressing-chamber of the air-pump cylinder, so that it gives off some of its heat to the air in the latter; but this is not entirely cold, as it is already heated a little by the air used for blowing the previous article, which was sucked up again by the retreating piston and returned to the compressing-chamber of the cylinder. By the insertion of the blowing-head it is only further heated. In other words, the quantity of heat lost in the meantime by radiation on the walls of the cylinder is replaced. In this way the blowing apparatus generates itself its heated air. Only at the beginning of the operation is it necessary to work a few times with cold air.

In order to quickly effect the removal of the glass article blown up in the mold and the insertion of a pressed article and to attain that, with one single mold, a great number of differently-shaped articles may be produced, the mold is, in my case, of the following construction: On a bottom plate $q$ are pivotally arranged two pairs of lever-arms $r\ r$, between the free ends of which rotates on a pivot $t$ a prismatic molding-block $s$. These two blocks are provided on each of their four sides with cavities of different shapes, 1 2 3 4, corresponding with one-half of a glass vessel. Of course each one of these half-molds is so arranged on the face of the prism that by turning the prisms two corresponding surfaces and half-molds can be brought to face and touch each other, as required for forming a complete mold. Any two corresponding half-molds must further meet in the plane of the descent of the stamper if a stamper $n$ of an unchangeable direction of stroke is used for the pressing. The two molding-blocks, whose sides must fit upon each other in a precise and tight manner, are pressed together by suitable means—for instance, by fork-shaped levers $w$, provided with a handle $v$ and engaging with their forked ends the pegs on which is suspended the other molding-block—so that the divided mold formed by the same is firmly closed on the descent of the stamper $n$ and lies precisely in the center axis of the stamper, so that a non-intended rotation is impossible. For opening the mold the two halves of the mold are, after removing the closing-lever $w$, seized and separated and then for the purpose of forming another mold turned out of the position indicated by a dotted line in the direction marked by arrows in Fig. 5 on the suspension-pegs $t$, $z$, or $x$, whereupon they are again brought together for forming another mold for the glass mass, which position is shown in Fig. 3. For turning the mold-prisms hand-wheels $z$ may be provided.

What I claim as my invention, and desire to secure by United States Letters Patent, is—

1. In an apparatus for finishing pressed articles of hollow glass, the combination with one end of an ordinary blowpipe $a$ of an air-pump cylinder $c$ of the usual shape, said combination being adapted to allow of an immediate passage of air between the compressing-chamber of the cylinder and the blowing-head $i$ at the end of the blowpipe and of a heating of the air in the compressing-chamber, on the blowing-head being inserted into the opening of the vessel to be blown, and also of the air being sucked back on finishing the blowing, substantially as set forth.

2. In a blowing-mold, in combination two excavated prismatic blocks rotating on parallel axes, two corresponding side faces which form a set of half-molds 1 to 4, means for turning these mold-blocks all around their axes and in this way bringing opposite to each other the different faces of the prisms into the positions required for forming complete molds, substantially as and for the purpose set forth.

In testimony whereof I have signed my name to this specification in the presence of two subscribing witnesses.

JOSEF HECKER.

Witnesses:
WILHELM KUEPPERS,
TOH SCHOLZ.